US011956745B2

United States Patent
Laddu et al.

(10) Patent No.: US 11,956,745 B2
(45) Date of Patent: Apr. 9, 2024

(54) MULTI-TRP PUCCH DESIGN CONSIDERATIONS

(71) Applicant: Nokia Technologies Oy, Espoo (FI)

(72) Inventors: Keeth Saliya J. Laddu, Espoo (FI); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 17/441,060

(22) PCT Filed: Mar. 11, 2020

(86) PCT No.: PCT/IB2020/052167
§ 371 (c)(1),
(2) Date: Sep. 20, 2021

(87) PCT Pub. No.: WO2020/194103
PCT Pub. Date: Oct. 1, 2020

(65) Prior Publication Data
US 2022/0182957 A1   Jun. 9, 2022

Related U.S. Application Data

(60) Provisional application No. 62/825,105, filed on Mar. 28, 2019.

(51) Int. Cl.
*H04W 56/00* (2009.01)
*H04B 7/024* (2017.01)
*H04W 72/0453* (2023.01)

(52) U.S. Cl.
CPC ........ *H04W 56/0045* (2013.01); *H04B 7/024* (2013.01); *H04W 72/0453* (2013.01)

(58) Field of Classification Search
CPC . H04W 56/0045; H04W 52/52; H04W 76/20; H04W 74/0816; H04W 72/25; H04W 72/04; H04W 74/08
See application file for complete search history.

(56) References Cited

U.S. PATENT DOCUMENTS

2015/0334707 A1   11/2015  Rajagopalan et al.
2016/0302129 A1   10/2016  Lohr et al.
(Continued)

FOREIGN PATENT DOCUMENTS

WO   2019/047950 A1   3/2019

OTHER PUBLICATIONS

"Revised WID: Enhancements on MIMO for NR", 3GPP TSG RAN Meeting #81, RP-182067, Agenda: 9.4.1, Samsung, Sep. 10-13, 2018, 5 pages.
(Continued)

*Primary Examiner* — Iqbal Zaidi
(74) *Attorney, Agent, or Firm* — Robert P. Michal, Esq.; Carter, DeLuca & Farrell LLP (57) ABSTRACT

In accordance with an example embodiment of the present invention, a method comprising: receiving, by a user equipment from a network node, an indication of configured channel resources for use by the user equipment in communication with the network node and at least one other network node of a communication network, wherein the configured channel resources are channel resources configured in coordination with the network node and the at least one other network node; and using, by the user equipment, the channel resources to at least avoid collisions during the communication with the network node and the at least one other network node.

6 Claims, 6 Drawing Sheets

(56) References Cited

U.S. PATENT DOCUMENTS

| | | | |
|---|---|---|---|
| 2017/0244501 A1* | 8/2017 | Yasukawa | H04W 52/383 |
| 2018/0084546 A1 | 3/2018 | Guo et al. | |
| 2018/0139747 A1 | 5/2018 | Hosseini et al. | |
| 2018/0262313 A1 | 9/2018 | Nam et al. | |
| 2018/0302888 A1 | 10/2018 | Stiriling-Gallacher et al. | |
| 2019/0081750 A1 | 3/2019 | Yang et al. | |
| 2020/0351892 A1* | 11/2020 | Yi | H04L 5/0092 |
| 2022/0116898 A1* | 4/2022 | Ying | H04W 56/005 |

OTHER PUBLICATIONS

"3rd Generation Partnership Project; Technical Specification Group Radio Access Network; NR; Physical layer procedures for control (Release 15)", 3GPP TS 38.213, V15.4.0, Dec. 2018, pp. 1-104.

"3rd Generation Partnership Project; Technical Specification Group Radio Access Network; NR; Requirements for support of radio resource management (Release 15)", 3GPP TS 38.133, V15.4.0, Dec. 2018, pp. 1-876.

"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.

"Discussion on UL multi-panel/TRP operation", 3GPP TSG RAN WG1 Meeting #90, R1-1714345, Agenda: 6.1.2.1.6, Huawei, Aug. 21-25, 2017, 5 pages.

"Summary of the E-mail Discussion [89-21]: OnLong PUCCH for NR", TSG-RAN WG1 NR AH Meeting#2, R1-17xxxxx, Agenda: 5.1.3.2.2, Ericsson, Jun. 27-30, 2017, 11 pages.

International Search Report and Written Opinion received for corresponding Patent Cooperation Treaty Application No. PCT/IB2020/052167, dated Jul. 3, 2020, 13 pages.

"Multi-TRP Enhancements", 3GPP TSG-RAN WG1 Meeting #96, R1-1903043, Agenda: 7.2.8.2, Qualcomm Incorporated, Feb. 25-Mar. 1, 2019, 30 pages.

"Overview of Multi-TRP/Panel Enhancements", 3GPP TSG RAN WG1 Meeting #94bis, R1-1810682, Agenda: 7.2.8.2, AT&T, Oct. 8-12, 2018, 24 pages.

* cited by examiner

MULTI-TRP PUCCH DESIGN CONSIDERATIONS

RELATED APPLICATION

This application claims priority to PCT Application No. PCT/IB2020/052167 filed Mar. 11, 2020, which claims priority to US Application 62/825105 filed Mar. 28, 2019 which is incorporated herein by reference in its entirety.

TECHNICAL FIELD

The teachings in accordance with the exemplary embodiments of this invention relate generally to an improved method of providing to user equipment performing multi-TRP transmissions with different Tx/Rx Points a channel resource configuration and, more specifically, relate to providing to user equipment performing multi-TRP transmissions with different Tx/Rx Points a channel resource configuration as coordinated between the different Tx/Rx Points.

BACKGROUND

This section is intended to provide a background or context to the invention that is recited herein. The description herein may include concepts that could be pursued, but are not necessarily ones that have been previously conceived or pursued. Therefore, unless otherwise indicated herein, what is described in this section is not prior art to the description or any subsequent claims in this application and is not admitted to be prior art by inclusion in this section.

Certain abbreviations that may be found in the description and/or in the Figures are herewith defined as follows:
CE control element
CSI channel-state information
FFS for future study
HARQ hybrid automatic repeat request
TA timing advance
TDM time division multiplexing
TRP Tx/Rx Point
Tx transmission
eMBB enhanced mobile broadband
MAC medium access control
MAC CE MAC Control Element
PDCCH physical downlink control channel
PUCCH physical uplink control channel
Rx reception
SFN single frequency network
TDM time division multiplexing
TP propagation delay
URLLC ultra reliable low latency communication Operations for Multi-TRP/Panel transmissions at the time of this application for enhancements on MIMO are part of an ongoing 3GPP work item. Multi-TRP/Panel transmission is considered an essential component in NR deployments not only due to the benefits of eMBB operations but also due to the capability of improving reliability for the URLLC services.

Figure 1:
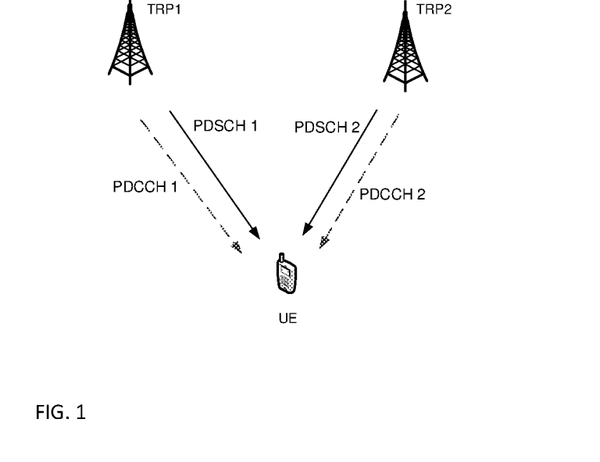
FIG. 1 shows PDCCH scheduling transmission of NR-PDSCH from different TRPs.

FIG. 1 shows PDCCH scheduling transmission of NR-PDSCH from different TRPs as in accordance with current Multi-TRP/Panel transmission standards at the time of this application. As shown in FIG. 1 there is a UE in communication with a TRP1 and a TRP2. As shown in FIG. 1 the UE is receiving PDSCH1 and PDCCH1 independently from TRP1 and receiving PDSCH2 and PDCCH2 independently from TRP2. It is noted that with this scenario the probability communication issues including scheduled collisions is great.

Example embodiments of the invention as disclosed herein at least work to eliminate or greatly reduce such issues including collisions resulting from these operations.

SUMMARY

Various aspects of examples of the invention are set out in the claims.

According to a first aspect of the present invention, a method comprising: receiving, by a user equipment from a network node, an indication of configured channel resources for use by the user equipment in communication with the network node and at least one other network node of a communication network, wherein the configured channel resources are channel resources configured in coordination with the network node and the at least one other network node; and using, by the user equipment, the channel resources to at least avoid collisions during the communication with the network node and the at least one other network node.

According to a second aspect of the present invention, an apparatus comprising: at least one processor; and at least one memory including computer program code, wherein the at least one memory and the computer program code are configured, with the at least one processor, to cause the apparatus to at least: receive, from a network node, an indication of configured channel resources for use by the apparatus in communication with the network node and at least one other network node of a communication network, wherein the configured channel resources are channel resources configured in coordination with the network node and the at least one other network node; and use the channel resources to at least avoid collisions during the communication with the network node and the at least one other network node.

According to a third aspect of the present invention, A non-transitory computer storage medium encoded with a computer program, the program comprising instructions that when executed by one or more computers cause the one or more computers to perform operations comprising: receiving, by a user equipment from a network node, an indication of configured channel resources for use by the user equipment in communication with the network node and at least one other network node of a communication network, wherein the configured channel resources are channel resources configured in coordination with the network node and the at least one other network node; and using, by the user equipment, the channel resources to at least avoid collisions during the communication with the network node and the at least one other network node.

According to a fourth aspect of the present invention, a method comprising: configuring, by a network node, channel resources for a user equipment in communication with the network node and at least one other network node of a communication network, wherein the configuring comprises coordinating with the at least one other network node the configured channel resources; and sending towards the user equipment an indication of the configured channel resources for use by the user equipment to at least avoid collisions during the communication with the network node and the at least one other network node.

According to a fifth aspect of the present invention, an apparatus comprising: at least one processor; and at least one memory including computer program code, wherein the at least one memory and the computer program code are configured, with the at least one processor, to cause the apparatus to at least: configure channel resources for a user equipment in communication with the apparatus and at least one other network node of a communication network, wherein the configuring comprises coordinating with the at least one other network node the configured channel resources; and sending towards the user equipment an indication of the configured channel resources for use by the user equipment to at least avoid collisions during the communication with the apparatus and the at least one other network node.

According to a sixth aspect of the present invention, A non-transitory computer storage medium encoded with a computer program, the program comprising instructions that when executed by one or more computers cause the one or more computers to perform operations comprising: configuring, by a network node, channel resources for a user equipment in communication with the network node and at least one other network node of a communication network, wherein the configuring comprises coordinating with the at least one other network node the configured channel resources; and sending towards the user equipment an indication of the configured channel resources for use by the user equipment to at least avoid collisions during the communication with the network node and the at least one other network node.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In accordance with example embodiments of the invention there is proposed at least a method and apparatus for providing to user equipment performing multi-TRP transmissions with different Tx/Rx Points a channel resource configuration as coordinated between the different Tx/Rx Points.

As similarly stated above, example embodiments of the invention are related to improving Multi-TRP/Panel transmissions. Multi-TRP/Panel transmission considers as an essential component in NR deployments not only due to the benefits of eMBB operations but also due to the capability of improving reliability for the URLLC services. A work item description of MIMO enhancements at the time of this application indicates the following:

Enhancements on multi-TRP/panel transmission including improved reliability and robustness with both ideal and non-ideal backhaul:

Specify downlink control signalling enhancement(s) for efficient support of non-coherent joint transmission;

Perform study and, if needed, specify enhancements on uplink control signalling and/or reference signal(s) for non-coherent joint transmission; and Multi-TRP techniques for URLLC requirements are included in this WI.

In 3GPP discussions at the time of this application, two techniques have been agreed for supporting multi-TRP transmission in NR, namely single PDCCH design and multiple PDCCH design. Single PDCCH schedules single PDSCH where separate layers are transmitted from separate TRPs, whereas multiple PDCCHs each scheduling a respective PDSCH where each NR-PDSCH is transmitted from a separate TRP.

In the multiple PDCCH design, PDCCHs from different TRPs schedule respective PDSCHs. The transmission of PDCCHs may happen independently from two TRPs. Therefore, this technique is suited for the cases of both ideal and non-ideal backhaul.

In 3GPP discussions at the time of this application it has been agreed that separate ACK/NACK feedback will be supported for the multi-PDCCH design. The agreement indicated for multiple-PDCCH based multi-TRP/panel downlink transmission for eMBB:

Separate ACK/NACK payload/feedback for received PDSCHs is supported

FFS: Details on PUCCH carrying separate ACK/NACK payload/feedback; and

FFS: Whether to additionally support joint ACK/NACK payload/feedback for received PDSCHs.

Further, in 3GPP discussions at the time of this application, it was further agreed that PUCCH resources that conveying ACK/NACK feedback can be TDM with separated HARQ-ACK codebook. TDM within a slot and simultaneous PUCCH transmission has taken some traction in the discussions.

The agreement indicated as follows:

For separate ACK/NACK payload/feedback for received PDSCHs where multiple DCIs are used:

PUCCH resources conveying ACK/NACK feedback can be TDM with separated HARQ-ACK codebook, FFS TDM within a slot, FFS: the format of PUCCH from multiple TRP shall be same or different.

For issues related to PUCCH resources, studies at the time of this application include:

if PUCCH resources conveying ACK/NACK feedback are overlapped at time, whether predefined dropping rule is needed to drop ACK/NACK feedback;

how to handle ACK/NACK overlapping with CSI reporting for different TRPs;

how to handle PUCCH overlapping with PUSCH at the time domain for different TRPs;

whether the UE can assume simultaneous ACK/NACK transmission from multiple PUCCH resources, and associated details of configurations/indication/UE capability.

Figure 2:
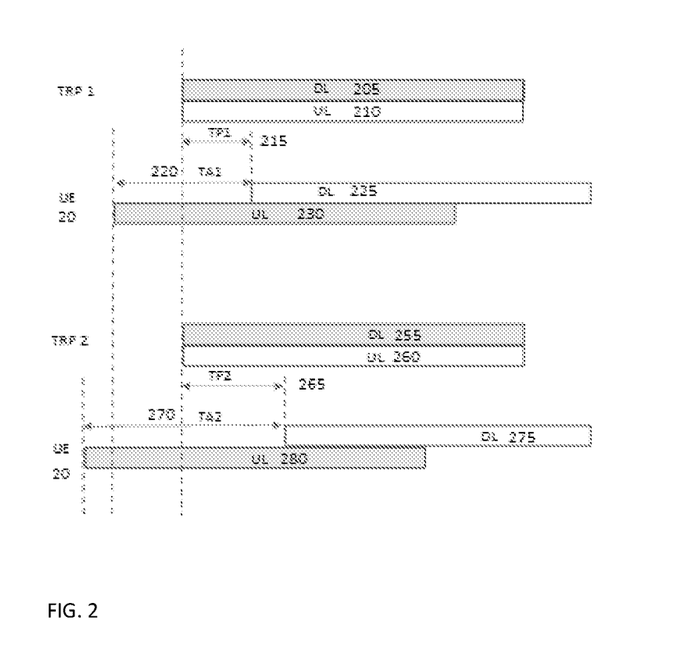
FIG. 2 shows a user equipment maintaining a timing advance for each of two Tx/Rx Points.

There is seen to be at least one problem in that Multi-TRP transmissions with multiple PDCCHs can generally have different timing advance (TA) controls, where the UE may require maintaining multiple TA control loops with the parent TRPs, see FIG. 2.

Even though TA mainly depends on the propagation delay, it is also possible that TRPs further indicate $TA_{offset}$ such that TRP can maintain UL/DL switching gap as defined in TS 38.133. It is possible that one TRP has this indication and the other one does not use that. In addition, the DL timing of the TRPs can be misaligned due to oscillator drifts, differences of the synchronization sources, and many other reasons. All these may cause concerns at the TRPs when scheduling PUUCH or PUSCH resources in the UL mainly considering they are TDM'ed within a slot.

FIG. 2 shows a user equipment maintaining a timing advance for each of two Tx/Rx Points. As shown in FIG. 2 the TRP1 is communicating DL 205 and UL 210. As shown in FIG. 2 there is an uplink TP1 215 scheduled by TRP1 for the UE 20 during the UL 210. Then as shown in step 220 of FIG. 2 there is a TA1 performed by the UE 20 based on the TP1 215. For the TP1 communication the UE 20 performs DL 225 and UL 230 as shown in FIG. 2. Then for TP2 there is a DL 255 and UL 260. As shown in FIG. 2 there is an uplink TP2 265 scheduled by TRP2 for the UE 20 during the UL 260. Then as shown in step 270 of FIG. 2 there is a TA2 performed by the UE 20 based on the TP2 265. It is noted that these timing advance offsets TA1 and TA2 can work to eliminate or deduce collisions. Then for the TP2 communication the UE 20 performs DL 275 and UL 280 as shown in FIG. 2.

Considering multiple PUCCH resources TDM' ed within a slot for a UE, and the UE is expected to transmit the ACK/NACK in those PUCCH resources, having multiple TAs could cause partial overlaps in the time domain and may not be a feasible thing to do considering the capability of the UE. It is understandable that some UEs may still capable of doing that when they have multiple panels and simultaneous UL transmission is possible, but if UE's maximum power is not enough for simultaneous transmission, UE cannot transmit all PUCCHs when overlapping exists. Thus, in general, it is seen that the network must maintain the restrictions such that this kind of overlaps will not occur in the general case. In the case of non-ideal backhaul between two TRPs, scheduling PUCCH resources within a slot, without full understanding of the timing variation at the UL, becomes problematic. This invention is mainly focusing on solving this by using the TA related information and timing differences seen at the UE when allocating PUCCH resources.

Figure 3:
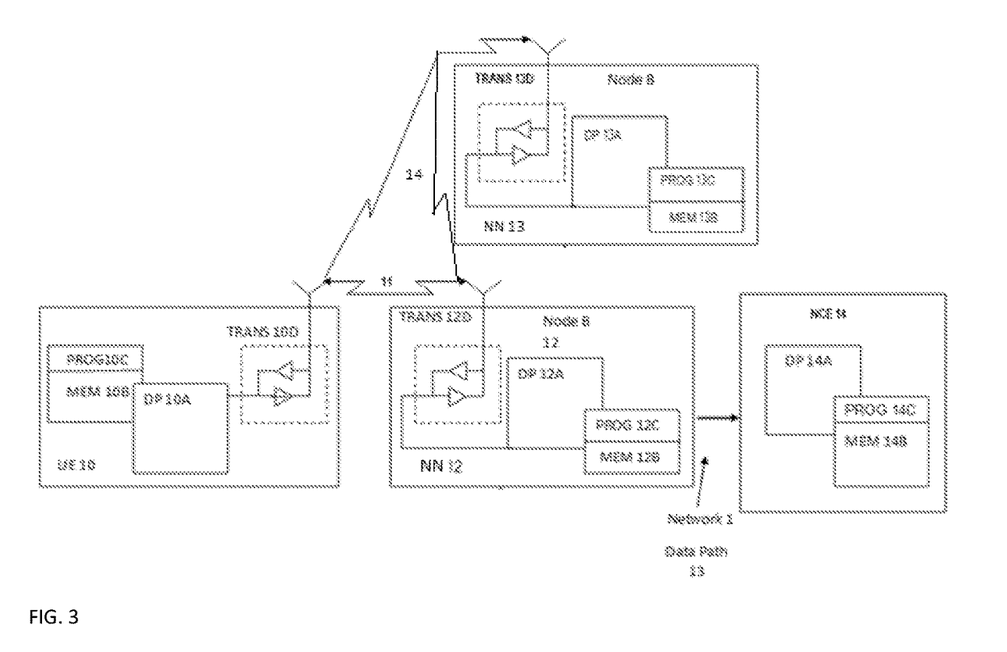
FIG. 3 shows a high level block diagram of various devices used in carrying out various aspects of the invention.

Before describing the example embodiments of the invention in detail, reference is made to FIG. 3 for illustrating a simplified block diagram of various electronic devices that are suitable for use in practicing the example embodiments of this invention.

FIG. 3 shows a block diagram of one possible and non-limiting exemplary system in which the example embodiments of the invention may be practiced. In FIG. 3, a user equipment (UE) 10 is in wireless communication with a wireless network 1. A UE is a wireless, typically mobile device that can access a wireless network. The UE 10 can comprise any portable electronic device including a cell phone, a computer, and/or a notebook or note pad type device such as a personal digital assistant type device. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 3. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or another network device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE 14 of FIG. 3.

The NN 13 (NR/5G Node B, an evolved NB, or LTE device) can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 13D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE 14 of FIG. 3.

The one or more buses of the device of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 3 shows a network nodes such as NN 12 and NN 13. Any of these network nodes NN 12 and/or NN 13 may can incorporate or be incorporated into an eNodeB or eNB or gNB such as for LTE and NR, and would still be configurable to perform example embodiments of the invention.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The NN 12 and the NN 13 are coupled via a link 13 and/or link 14 to the NCE 14. In addition, it is noted that the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

Figure 4:
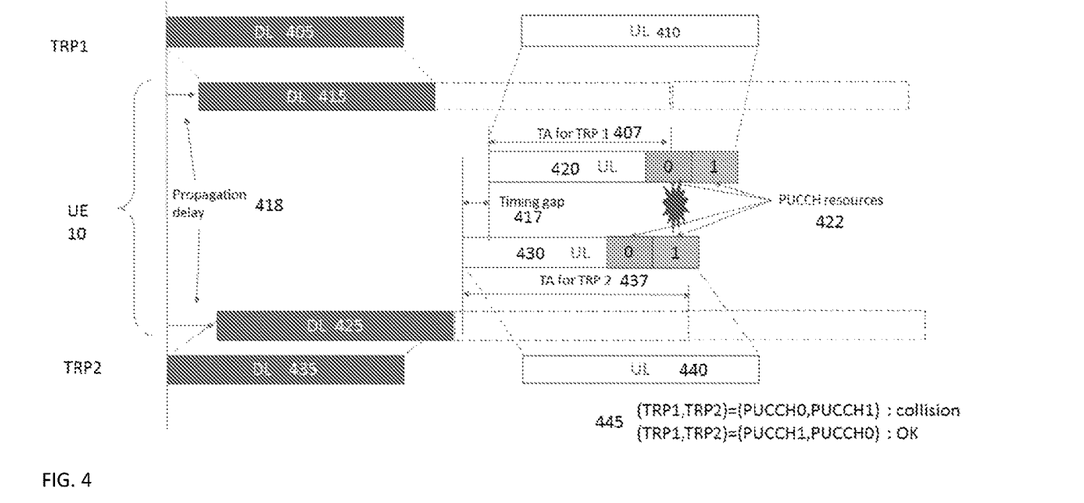
FIG. 4 shows a timing gap between two different Timing Advances used by the user equipment in accordance with example embodiments of the invention.

In accordance with an embodiment of the invention, related PUCCH scheduling for multi-TRP can be as follows:

The first TA value of the UE and the second TA value of the UE is used to indicate the ordering of the PUCCH resources by the two parent nodes, As an extension, the UE UL transmission timing gap to different TRPs can be used instead of exact TA values, see FIG. 4. Because TA value is calculated from the downlink reception timing, the first and the second TA may have different timing reference, and the ordering of PUCCH resources may not directly get from the TA values.

The ordering of the PUCCH resources is used at the TRPs to schedule PUCCH transmissions from the UE to each TRP in a TDM manner. In other words, time resources are efficiently used without partially overlaps due to different TA values, As an extension, the UE can report the measured timing difference to each TRP, to take into account when configuring PUCCH resources.

The timing difference can be rounded to SFN/slot/symbol level where TRPs can schedule PUCCH resources with enough guard period.

Timing difference may be reported by using reported TRP as the reference TRP, where both positive and negative values can be expected in practice.

The order of the PUCCH resources can be included in with HARQ feedback, or CSI feedback, or reported by separate signaling (e.g. MAC CE).

FIG. 4 shows a Timing gap between two different Timing Advances used by the user equipment in accordance with example embodiments of the invention. As shown in FIG. 4, following a DL 405 from TRP1 there is a TA 407 for TRP1 applied to a UL 410. As shown in FIG. 4 there is a DL 415 from the TRP1. Then a Timing gap 417 and a propagation delay 418. The delay shifting the DL 425 and the Timing gap 417 occurring during the UL 430. Then as shown in FIG. 4 there is a DL 435 from the TRP2, and a TR for TRP2 437 before a UL 440 to the TRP2.

Further, in accordance with an example embodiment of the invention, there is:

A separate TA control loop is maintained by the UE such that each TRP controls TA adjustments.

Change of received timing at a TRP can trigger the TA adjustment, which can be independent of the other TRP. This is expected when the UE is moving with respect to only one TRP.

When at least one TRP starts TA adjustment, the UE can use that as a trigger to update the new ordering of the PUCCH resources.

The TRP which correspond to the larger TA value may schedule the PUCCH resources in the first part of the allocated UL resources by both TRPs.
  In order to reduce the signaling overhead to configure new PUCCH resource, UE can be configured with multiple candidate resources for each TRP, and a dynamic indication of which PUCCH resource is used for each TRP can be provided.

As another embodiment, PUSCH transmissions from TRPs can be scheduled in a non-overlapping manner in UL with the knowledge of the order of the PUCCH resources (in other words, based on TA values).

As another embodiment, the order of the PUCCH resources may also be indicated in the form of the difference between TA values used by the UE.

As another embodiment, TRPs may use TA value difference to adjust the DL timing such that UE receives DL transmissions at the same time.

Figure 5:
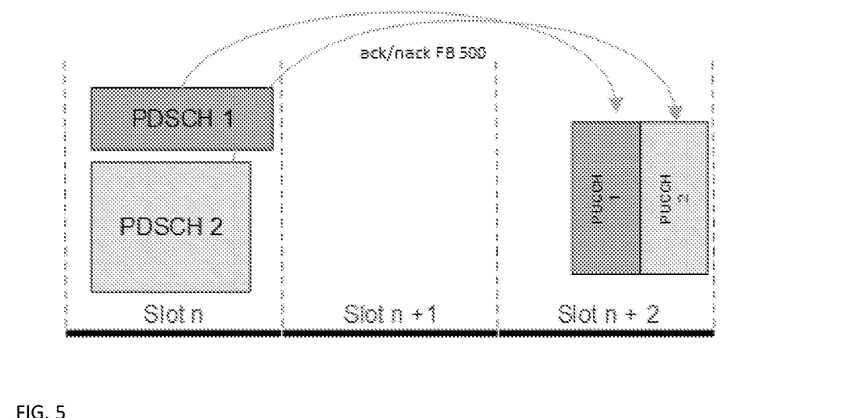
FIG. 5 shows Multi-physical downlink control channel based multi-TRP transmission with time division multiplexed physical uplink control channel resources in accordance with example embodiments of the invention.

In FIG. 5, there is illustrated a possible scenario for multiple PDCCH based multi-TRP transmission with PUCCH resources is allocated in a TDM manner within a slot. As shown in FIG. 5 there is ack/nack feedback 500 for PDSCH1 and PDSCH2 transmitted in resources PUCCH1 and PUCCH2 respectively. In accordance with example embodiments of the invention the ack/nack for each PDSCH are expected to be transmitted in separate PUCCH resources. This separate ack/nack feedback is applicable to both ideal and non-ideal backhaul cases. If there is a larger latency in the backhaul between the multiple TRPs, it is important that TRPs use predefined rule when sharing the PUCCH resources in a TDM manner. In accordance with example embodiments of the invention there is proposed TA values for TRP to be used as the guidance when scheduling PUCCH resources. In any case, the coordination between TRPs in a semi-static manner will also require knowing TA values for each TRP to have PUCCH resources TDM'ed within a slot. If there is variation in the TA value for a TRP, the UE can indicate the new ordering of TAs to both TRPs, where any partial overlapping at the UE transmission is avoided.

Figure 6A:
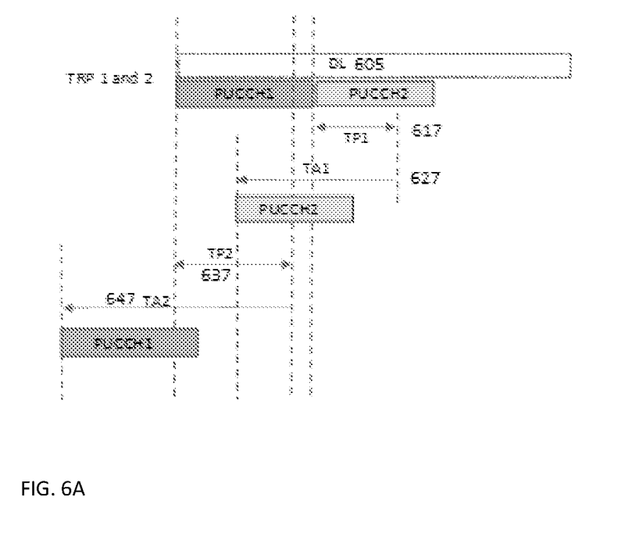
FIG. 6A shows PUCCH ordering with different timing advance values where Tx/Rx Point with larger timing advance has first physical uplink control channel resource, no overlapping, in accordance with example embodiments of the invention.
Figure 6B:
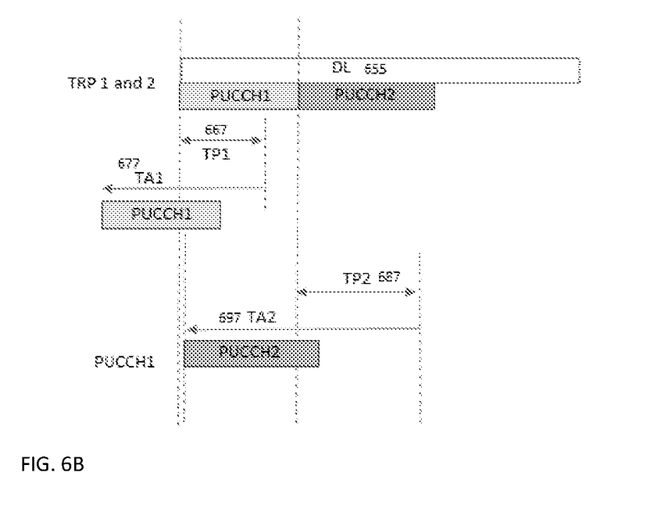
FIG. 6B shows PUCCH ordering with different timing advance values where Tx/Rx Point with smaller Timing Advance has first physical uplink control channel resource, overlapping, in accordance with example embodiments of the invention.

Next, as illustrated in FIG. 6A and FIG. 6B there is a different ordering method used for the PUCCH resources based on TA values of different TRPs. As shown in FIG. 6A there is TRP1 and TRP 2 providing DL 605 including PUCCH1 and PUCCH2. As shown in FIG. 6A a TP1 617 is scheduled and then a TA1 627 is set. As shown in FIG. 6A the TA1 627 causes PUCCH2 to be advanced. Then following TP2 637 of FIG. 6A there is a TA2 647. As shown in FIG. 6A the TA2 647 causes PUCCH1 to be advanced.

It is noted that in accordance with example embodiments of the invention, when a larger TA value is used first, there is no PUCCH transmission overlapping at the UE side. To handle the scenario illustrated in FIG. 6B, a gap between two PUCCH transmissions may require to be introduced, which at least larger than the difference between two TA values.

As shown in FIG. 6B there is TRP1 and TRP 2 providing DL 655 including PUCCH1 and PUCCH2. As shown in FIG. 6B a TP1 667 is scheduled and then a TA1 677 is performed. As shown in FIG. 6B the TA1 677 causes PUCCH1 to be advanced. Then following TP2 687 of FIG. 6B there is a TA2 697. As shown in FIG. 6B the TA2 697 causes PUCCH2 to be advanced. Because transmission durations of PUCCH1 and PUCCH2 are overlapped, without enough timing gap between PUCCH transmissions, one of PUCCH transmissions should be dropped.

Figure 7:
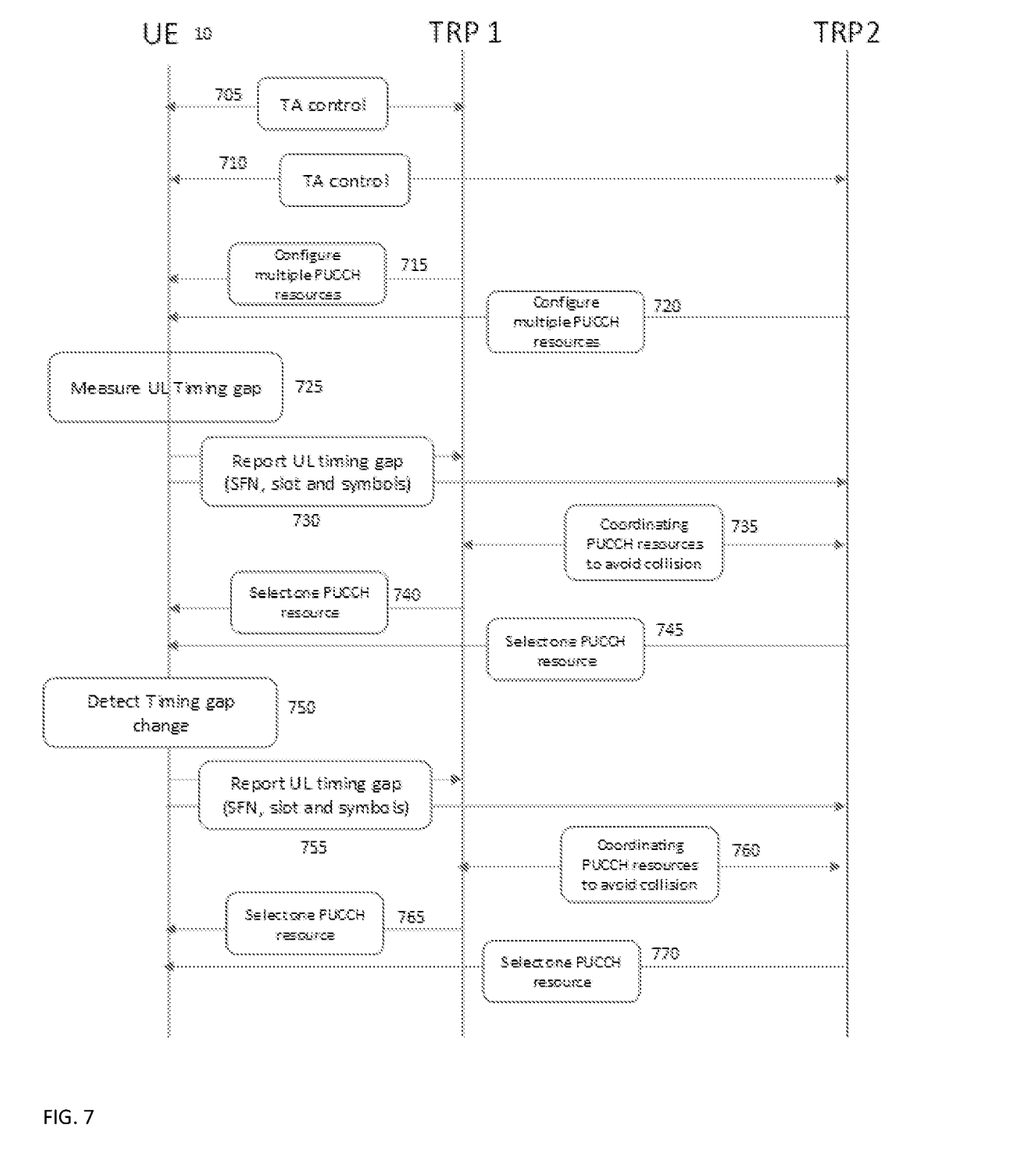
FIG. 7 shows a flow chart of the physical uplink control channel resource configuration in accordance with an example embodiment of the invention.

FIG. 7 illustrates a possible procedure for PUCCH resource configurations considering timing gap between two timing advances used by the UE. As shown in FIG. 7 there is shown communications of UE 10, TRP1, and TRP2. In step 705 of FIG. 7 TA control is communicated between the TRP1 and UE 10, and at step 710 TA control is communicated between the TRP2 and UE 10. Then in steps 715 and 720 of FIG. 7 there is configuring multiple PUCCH resources between the TRP1 and the UE 10 and the TRP2 and the UE 10, respectively. In step 725 of FIG. 7 there is measuring by the UE 10 a UL Timing gap 725. Then as shown in step 730 of FIG. 7 there is reporting by the UE 10 the UL Timing gap to the TRP1 and the TRP2, the reporting including SFN, slot, and symbols associated with the Timing gap. Then, in response to the reporting there is as shown in FIG. 7 coordinating between the TRP1 and the TRP2 PUCCH configuration of resources for the UE 10, the coordinating to configure resources such as to avoid collisions. In step 735, coordinating PUCCH resources to avoid collision includes TRP1 and TRP2 to decide the PUCCH resources to be used based on the reported timing difference (or PUCCH ordering information) by the UE 10, or exchange TA seen by the TRP, or exchange required timing gap between PUCCH resources to avoid collisions. The coordination may allow assigning PUCCH resource of a TRP with a faster UL timing be scheduled first compared to PUCCH resource of a TRP with a larger UL timing. The coordination may also allow assigning PUCCH resources of TRPs with a a sufficient gap between two PUCCH transmissions, where the gap is equal or larger than the reported timing difference by the UE. In steps 740 and 745 of FIG. 7 there is, based on the coordinated resource configurations, communicating by the TRP1 and TRP, respectively, selected PUCCH resources 740 and 745 to the UE 10. At step 750 of FIG. 7 the UE 10 detects Timing gap change. Then in step 755 the UE 10 reports the Timing gap change 750 to the TRP1 and the TRP2. In response to the reported Timing gap change the TRP1 and the TRP2 perform step 760 of FIG. 7 for Coordinating PUCCH resources, the coordinating similarly as above to configure resources such as to avoid collisions. In steps 765 and 770 of FIG. 7 there is, based on the coordinated resource configurations, communicating by the TRP1 and TRP, respectively, selected PUCCH resources 765 and 770 to the UE 10.

Figure 8A:
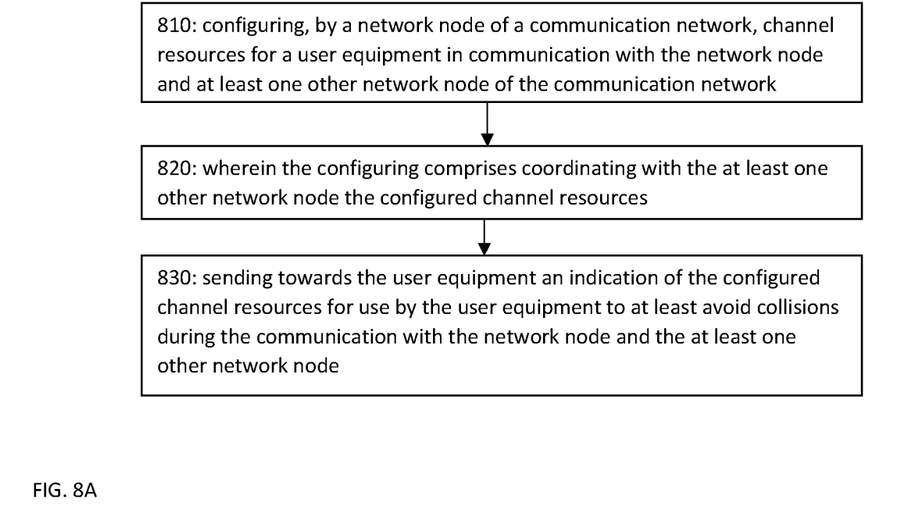
FIG. 8A and FIG. 8B each show a method in accordance with example embodiments of the invention which may be performed by an apparatus.

FIG. 8A illustrates operations which may be performed by a device such as, but not limited to, a device associated with the NN 12, and/or NN 13 as in FIG. 3. As shown in step 810 of FIG. 8A there is configuring, by a network node of a communication network, channel resources for a user equipment in communication with the network node and at least one other network node of the communication network. As shown in step 820 of FIG. 8A there is note that wherein the configuring comprises coordinating with the at least one other network node the configured channel resources. Then as shown in step 830 of FIG. 8A there is sending towards the user equipment an indication of the configured channel resources for use by the user equipment to at least avoid collisions during the communication with the network node and the at least one other network node.

In accordance with an example embodiment of the invention as described in the paragraph above the configuring is based on an indication from the user equipment of one of a timing advance value and timing gap associated with the communication.

In accordance with an example embodiment of the invention as described in the paragraphs above, the configuring is based on a change of a timing gap between a timing advance associated with the network node and a timing advance associated with the at least one other network node for the communication.

In accordance with an example embodiment of the invention as described in the paragraphs above, the channel resources comprises physical uplink channel resources.

In accordance with an example embodiment of the invention as described in the paragraphs above, the configuring comprises configuring one of a timing order and a timing gap associated with the channel resources for use by the user equipment.

In accordance with an example embodiment of the invention as described in the paragraphs above, the timing order is for uplink transmissions from the user equipment to the network node and the at least one other network node of the communication network using time division multiplexing.

In accordance with an example embodiment of the invention as described in the paragraphs above, the configuring comprises using the timing advance value to adjust a downlink timing of the communications such that the user equipment receives downlink transmissions at a same time.

In accordance with an example embodiment of the invention as described in the paragraphs above, the sending is performed with one of hybrid automatic repeat request feedback, channel-state information feedback, or a medium access control element.

A non-transitory computer-readable medium (MEM 12B and/or MEM 13B as in FIG. 3) storing program code (PROG 12C and/or PROG 13C as in FIG. 3), the program code executed by at least one processor (DP 12A and/or DP 13A as in FIG. 3) to perform the operations as at least described in the paragraphs above.

In accordance with an example embodiment of the invention as described above there is an apparatus comprising: means for configuring (MEM 12B and/or MEM 13B, PROG 12C and/or PROG 13C, and/or DP 12A and/or DP 13A as in FIG. 3), by a network node (NN 12 and/or NN 13 as in FIG. 3) of a communication network (network 1 as in FIG. 3), channel resources for a user equipment (UE 10 as in FIG. 3) in communication with the network node (NN 12 and/or NN 13 as in FIG. 3) and at least one other network node (NN 12 and/or NN 13 as in FIG. 3) of the communication network (network 1 as in FIG. 3), wherein the configuring comprises coordinating (TRANS 12D and/or TRANS 13D, MEM 12B and/or MEM 13B, PROG 12C and/or PROG 13C, and/or DP 12A and/or DP 13A as in FIG. 3) with the at least one other network node (NN 12 and/or NN 13 as in FIG. 3) the configured channel resources. Means for sending (TRANS 12D and/or TRANS 13D, MEM 12B and/or MEM 13B, PROG 12C and/or PROG 13C, and/or DP 12A and/or DP 13A as in FIG. 3) towards the user equipment (UE 10 as in FIG. 3) an indication of the configured channel resources for use by the user equipment to at least avoid collisions during the communication with the network node and the at least one other network node.

In accordance with the example embodiments as described in the paragraph above, at least the means for configuring, coordinating, and sending comprises a network interface, and computer program code (PROG 12C and/or PROG 13C as in FIG. 3) stored on a computer-readable medium (MEM 12B and/or MEM 13B as in FIG. 3) and executed by at least one processor (DP12A and/or DP 13C as in FIG. 3).

Figure 8B:
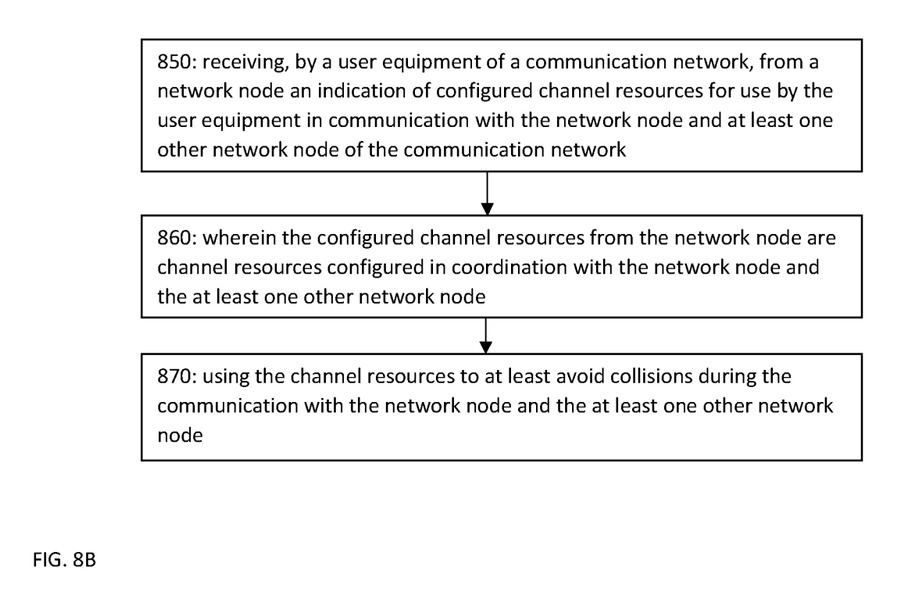

FIG. 8B illustrates operations which may be performed by a device such as, but not limited to, a device associated with the UE 10 as in FIG. 3. As shown in step 850 of FIG. 8B there is receiving, by a user equipment of a communication network, from a network node an indication of configured channel resources for use by the user equipment in communication with the network node and at least one other network node of the communication network, As shown in step 860 of FIG. 8B there is note that wherein the configured channel resources from the network node are channel resources configured in coordination with the network node and the at least one other network node. Then as shown in step 870 of FIG. 8B there is using the channel resources to at least avoid collisions during the communication with the network node and the at least one other network node.

In accordance with an example embodiment of the invention as described in the paragraph above, the indication of the configured channel resources are received from the network node in response to an indication from the user equipment of one of a timing advance value and timing gap associated with the communication.

In accordance with an example embodiment of the invention as described in the paragraphs above, the indication is indicating a change of a timing gap between timing advances associated with the communication.

In accordance with an example embodiment of the invention as described in the paragraphs above, the channel resources comprises physical uplink channel resources.

In accordance with an example embodiment of the invention as described in the paragraphs above, the configured channel resources comprises at least one of a timing order and a timing gap associated with the channel resources for use by the user equipment.

In accordance with an example embodiment of the invention as described in the paragraphs above, the timing order is for uplink transmissions from the user equipment to the network node and the at least one other network node of the communication network using time division multiplexing.

In accordance with an example embodiment of the invention as described in the paragraphs above, the configured channel resources is using the timing advances to adjust a downlink timing of the communications such that the user equipment receives downlink transmissions at a same time.

In accordance with an example embodiment of the invention as described in the paragraphs above, the configured channel resources are received over one of hybrid automatic repeat request feedback, channel-state information feedback, or a medium access control element.

A non-transitory computer-readable medium (MEM 10B as in FIG. 3) storing program code (PROG 10C as in FIG. 3), the program code executed by at least one processor (DP 10A as in FIG. 3) to perform the operations as at least described in the paragraphs above.

In accordance with an example embodiment of the invention as described above there is an apparatus comprising: means for receiving (TRANS 10D, MEM 10B, PROG 10C, and DP 10A as in FIG. 3), by a user equipment (UE 10 as in FIG. 3) of a communication network (Network 1 as in FIG. 3), from a network node (NN 12 and/or NN 13 as in FIG. 3) an indication of configured channel resources for use by the user equipment (UE 10 as in FIG. 3) in communication with the network node (NN 12 and/or NN 13 as in FIG. 3) and at least one other network node (NN 12 and/or NN 13 s in FIG. 3) of the communication network (network 1 as in FIG. 3), wherein the configured channel resources from the network node (NN 12 and/or NN 13 as in FIG. 3) are channel resources configured in coordination with the network node (NN 12 and/or NN 13 as in FIG. 3) and the at least one other network node (NN 12 and/or NN 13 as in FIG. 3). Means for using (TRANS 10D, MEM 10B, PROG 10C, and DP 10A as in FIG. 3) the channel resources to at least avoid collisions during the communication with the network node and the at least one other network node (NN 12 and/or NN 13 as in FIG. 3).

In accordance with the example embodiments as described in the paragraph above, at least the means for receiving and using comprises a network interface, and computer program code (PROG 10C as in FIG. 3) stored on a computer-readable medium (MEM 10B as in FIG. 3) and executed by at least one processor (DP10A as in FIG. 3).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of example embodiments of the invention as defined herein.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
   receiving, by a user equipment, an indication of configured channel resources for use by the user equipment in communication with a network node and at least one other network node of a communication network, wherein the configured channel resources are channel resources configured in coordination with the network node and the at least one other network node, and wherein the indication of the configured channel resources is received based on an information of the user equipment of at least one of a timing advance value and a timing gap associated with the communication; and
   using, by the user equipment, the channel resources to at least avoid collisions during the communication with the network node and the at least one other network node,
   wherein the information of the user equipment of at least one of a timing advance value and a timing gap associated with the communication indicates an order of physical uplink channel resources associated with the network node and the at least one other network node; and
   wherein the indication of the order of physical uplink channel resources is included in one of hybrid automatic repeat request feedback, channel-state information feedback, or a medium access control element.

2. The method of claim 1, further comprising: in response to a change of a timing gap between timing advances associated with the communication, reporting the change to the network node and/or the at least one other network node.

3. The method of claim 1, further comprising:
   receiving a timing advance adjustment from the network node and/or the at least one other network node;
   triggering update of an ordering of physical uplink channel resources associated with the network node and/or the at least one other network node.

4. The method of claim 1, wherein the channel resources comprise physical uplink channel resources.

5. The method of claim 1, wherein the configured channel resources are allocated based at least in part on the at least one of a timing advance value and a timing gap associated with the communication.

6. The method of claim 1, wherein the configured channel resources comprise time division multiplexing of channel resources for use by the user equipment with the network node and the at least one other network node.

* * * * *